3,190,760
MILK FOOD PRODUCT AND METHOD FOR MAKING SAME
Harry A. Morgan, Jr., Palos Verdes Estates, Calif., assignor of five percent to Lon Hocker, St. Louis, Mo., and five percent to Aaron S. Lapin, Beverly Hills, Calif., and of seventy-seven percent to Morgan Associates, Palos Verdes Estates, Calif., a partnership
No Drawing. Filed Nov. 13, 1962, Ser. No. 237,361
8 Claims. (Cl. 99—201)

This invention relates to a milk food product and the method for making same and more particularly to such a product which is in solid form and which is manufactured from dried milk.

The nutritional value of milk is well established, yet milk in its liquid or frozen forms has certain limitations which make its consumption less than it would be desired. This is due to several factors. First, milk in its liquid and frozen forms tends to spoil readily, making its distribution and storage a problem especially in remote underdeveloped parts of the world. This problem has been somewhat alleviated by the development of powdered milk which can be reconstituted as fluid fluid by adding water. But, in some areas of the world such as the Orient, fluid milk has not been accepted to any great extent due to age old dietary habits. Secondly, many children and adults find liquid milk unpalatable.

The milk food product of this invention provides a milk food product which can be readily manufactured from powdered milk to take the form of dry pieces or bits. These pieces or bits may be in the form of puffed balls, flakes, or flat pieces. The bits are such that they do not dissolve in liquids such as milk or cream and the end product can make for a highly desirable breakfast food. It has a crispy quality and with the proper flavoring which can readily be added is suitable for use as a highly palatable packaged snack food of superior nutritional value as compared with most such foods on the market. It is to be noted that most ready to eat breakfast foods are produced from cereal products. For the production of such foods, a large amount of processing equipment is required since the grains and/or farinaceous materials must be cooked, partially dried, tempered, formed and then dried again to the desired moisture content. Such foods also lack certain nutritional factors in their natural form and compounds containing such elements as calcium and phosphorus are generally added to the natural product. The food of this invention requires a minimum amount of processing equipment and has all the high nutritional content of the milk from which it is fabricated.

It is therefore an object of this invention to provide a new milk food product.

It is a further object of this invention to provide milk in a more palatable form.

It is a still further object of this invention to increase the consumption of milk.

It is another object of this invention to provide a breakfast or snack food of high nutritional value.

It is still another object of this invention to provide a method by which ordinary milk powder can be converted into a palatable, ready-to-eat food product.

It is still another object of this invention to provide a new high nutritional breakfast and snack food which is simple and economical to fabricate.

Other objects of this invention will become apparent as the following description proceeds.

The product of this invention is fabricated by adding a liquid which may be water to powdered milk of either the "whole milk" or "non-fat milk" variety, mixing to form a plastic mass, dividing this mass into small bits and drying these bits. The bits may be formed into any desired shape such as, for example, balls, cubes, or flakes. The bits may also be puffed while drying in a vacuum drier.

In carrying out this invention, a liquid such as water or evaporated milk is added to conventional milk powder of either the regular or "instantized" type to increase the moisture content of the mass formed to between 10 and 35 percent, a more preferred moisture content being between 15 and 20 percent. The mixture is then blended to form a homogeneous, workable plastic mass. This mass is then formed into bits of the desired shape. These bits are then transferred to suitable drying equipment where they are dried to less than 6% moisture content, a more preferred moisture content being less than 4%. If a puffed end product is desired, the bits may be placed in a vacuum drier where puffing may be accomplished simultaneously with drying in accordance with techniques well known in the art.

The following examples will serve to illustrate the fabrication of several variations of the product of the invention from milk powder as defined in Table I below.

TABLE I
[PERCENT BY WEIGHT]

| Product | Fat | Protein | Carbohydrate | Mineral | Moisture |
|---|---|---|---|---|---|
| Whole milk powder | 27.0 | 26.5 | 38.0 | 6.0 | 2.5 |
| Non-fat milk powder | 0.8 | 36.7 | 51.0 | 8.0 | 3.5 |

*Example I*

Non-fat milk powder per Table I is mixed with a liquid such as water to increase the moisture content to 15–20 percent. This mixture is thoroughly blended to form a workable plastic mass. This mixing is done at room temperature (65–80 deg. F.). The blended mass is formed into a flat sheet of between .08 and .06 inch in thickness. The sheet is cut to form flat bits approximately ½" square. The bits are then transferred to a drier where they are dried by hot air at a temperature of approximately 250 deg. F. to a final moisture content of less than 4% by weight. The final product has the shape of small pillows.

*Example II*

The same procedure is followed as in Example I except that the mass is formed into pellets approximately .20" in diameter rather than in flat bits, and the pellets are dried and simultaneously puffed in a vacuum drier utilizing radiant heat. The final product is in the form of puffed balls.

*Example III*

82 parts of non-fat milk powder per Table I is blended with 18 parts sucrose. The mixture is then formed into pellets and puffed and dried as in Example II.

*Example IV*

The same procedure is followed as in Example I except that 12.6 parts of whole milk powder is blended with 72.4 parts of non-fat milk powder and 15 parts of sucrose to form the plastic mass, the milk powders being as described in Table I.

*Example V*

A mass is prepared as in Example IV and processed as in Example II.

*Example VI*

A plastic mass is formed as in Example IV. The mass is then flaked by means of suitable flaking equipment. The resultant flakes are then transferred to a drier where they are dried to a final moisture content of less than 4%, the flakes being constantly but gently agitated during the drying process.

The end product resulting from each of the foregoing examples is a crisp, palatable, and highly nutritional food product which can be eaten either in the dry form or with liquid cream or milk added. The resultant food product does not tend to become soggy in the liquid prior to being eaten.

It should be understood that the above examples are set forth for illustrative purposes and that many other variations can be made in this basic food product. For example, the product can be made using varying amounts of sugar and fats of either the milk-fat or vegetable-fat type. Evaporated milk may be utilized as the liquid. Further, minerals, vitamins, flavorings, colorings, stabilizers, emulsifiers, and preservatives can be added as the particular requirements may dictate.

In order to obtain greater efficiency in large scale production, it may be desirable to preheat the bits prior to placing in a vacuum drier for puffing. Also, in some instances it may be desirable to accomplish final drying in an atmospheric drier following removal from the vacuum drier. Another production variation which may be desirable is to preheat the dry milk either initially or while mixing same with liquid.

While this invention has been described in detail it is to be clearly understood that this is intended by way of illustration and example only and not be way of limitation, the spirit and scope of the invention being limited only by the terms of the following claims.

I claim:
1. A process for manufacturing a milk food product which is substantially insoluble in water and has a crisp quality comprising adding moisture to powdered milk in an amount sufficient to form a plastic mass, separating said mass into bits whereby said bits are formed into a predetermined shape, and drying the bits to a moisture content of less than 6%.

2. The process as recited in claim 1 wherein moisture is added to bring the moisture content of said mass to between 10 and 35% and said bits are dried to less than 6% moisture content.

3. A process for making a milk food product which is substantially insoluble in water and has a crisp quality comprising mixing powdered milk with liquid to form a plastic mass having between 15 and 20% moisture content, separating said mass into pieces, forming said pieces into a predetermined shape, heating said pieces, and puffing and drying said pieces in a vacuum drier to a moisture content of less than 6%.

4. A process for making a milk food product which is substantially insoluble in water and has a crisp quality comprising adding liquid to dried milk to form a plastic mass having a moisture content of between 10 and 35%, separating said mass into bits whereby said bits are formed to a predetermined shape, and drying said bits to a moisture content of less than 4% by weight.

5. The process as recited in claim 4 wherein a sweetener is additionally added to form the plastic mass in amount sufficient to sweeten said mass.

6. The process as recited in claim 4 wherein liquid is added to form a mass having between 15 and 20 percent moisture content.

7. The process as recited in claim 4 wherein said bits are formed into pellets and said pellets are simultaneously puffed and dried.

8. The product made by the process recited in claim 1.

References Cited by the Examiner

UNITED STATES PATENTS

| | | | |
|---|---|---|---|
| 939,495 | 11/09 | Govers | 99—202 |
| 1,070,781 | 8/13 | Davis | 99—56 |
| 1,689,357 | 10/28 | Merrell | 99—56 |
| 2,839,407 | 6/58 | Brochner | 99—56 |

FOREIGN PATENTS

| | | |
|---|---|---|
| 350,670 | 6/31 | Great Britain. |
| 346,754 | 7/60 | Switzerland. |

OTHER REFERENCES

Hunziker: "Condensed Milk and Milk Powder," 1949, 7th ed. publ. by author, La Grange, Ill., p. 387.

Whittier et al.: Byproducts From Milk, Reinhold Publ. Co., New York, 1950, p. 116 relied on.

A. LOUIS MONACELL, *Primary Examiner.*

WILLIAM B. KNIGHT, *Examiner.*